US010265621B2

(12) United States Patent
Goslin et al.

(10) Patent No.: US 10,265,621 B2
(45) Date of Patent: Apr. 23, 2019

(54) TRACKING SPECIFIC GESTURES RELATIVE TO USER MOVEMENT

(71) Applicant: Disney Enterprises, Inc., Burbank, CA (US)

(72) Inventors: Michael P. Goslin, Sherman Oaks, CA (US); Joseph L. Olson, Los Angeles, CA (US); Eric C. Haseltine, Silver Spring, MD (US)

(73) Assignee: Disney Enterprises, Inc., Burbank, CA (US)

( * ) Notice: Subject to any disclaimer, the term of this patent is extended or adjusted under 35 U.S.C. 154(b) by 477 days.

(21) Appl. No.: 14/601,105

(22) Filed: Jan. 20, 2015

(65) Prior Publication Data

US 2016/0206957 A1 Jul. 21, 2016

(51) Int. Cl.
| | |
|---|---|
| *A63F 13/428* | (2014.01) |
| *G06F 3/0346* | (2013.01) |
| *G06F 3/01* | (2006.01) |
| *A63F 13/833* | (2014.01) |
| *A63F 13/211* | (2014.01) |
| *A63F 13/245* | (2014.01) |
| *A63F 13/213* | (2014.01) |

(52) U.S. Cl.
CPC .......... *A63F 13/428* (2014.09); *A63F 13/211* (2014.09); *A63F 13/245* (2014.09); *A63F 13/833* (2014.09); *G06F 3/011* (2013.01); *G06F 3/017* (2013.01); *G06F 3/0346* (2013.01); *A63F 13/213* (2014.09)

(58) Field of Classification Search
CPC .... A63F 13/428; A63F 13/211; A63F 13/245; A63F 13/833; A63F 13/213; G06F 3/107
See application file for complete search history.

(56) References Cited

U.S. PATENT DOCUMENTS

| | | | |
|---|---|---|---|
| 8,456,298 B2 | 6/2013 | Valtonen | |
| 8,625,855 B2 | 1/2014 | El Dokor | |
| 8,831,826 B2 | 9/2014 | Ricci | |
| 9,855,497 B2 | 1/2018 | Goslin et al. | |
| 2006/0256072 A1* | 11/2006 | Ueshima | A63F 13/02 345/156 |
| 2008/0192005 A1 | 8/2008 | Elgoyhen et al. | |
| 2009/0262074 A1* | 10/2009 | Nasiri | A63F 13/06 345/158 |

(Continued)

OTHER PUBLICATIONS

Kang et al. "Recognition-based gesture spotting in video games", available online Aug. 4, 2004, 14 pages <http://www.sciencedirect.com/science/article/pii/S0167865504001576>.

(Continued)

*Primary Examiner* — Werner G Garner

(74) *Attorney, Agent, or Firm* — Patterson + Sheridan, LLP

(57) ABSTRACT

Techniques are disclosed for distinguishing user movements in an immersive play environment. A first tracking device is provided that measures first tracking data. A second tracking device is also provided to measure second tracking data. A controller device is also provided to receive tracking data from the second tracking device. The second tracking device measures movement of a user by receiving the first tracking data from the first tracking device and determining third tracking data movement based on a combination of the first tracking data and the second tracking data.

20 Claims, 7 Drawing Sheets

(56) References Cited

U.S. PATENT DOCUMENTS

| | | | |
|---|---|---|---|
| 2009/0265671 A1 | 10/2009 | Sachs et al. | |
| 2011/0009241 A1* | 1/2011 | Lane | A63B 24/0087 |
| | | | 482/8 |
| 2012/0007713 A1* | 1/2012 | Nasiri | G06F 1/1694 |
| | | | 340/5.81 |
| 2012/0036433 A1 | 2/2012 | Zimmer et al. | |
| 2013/0278501 A1 | 10/2013 | Bulzacki | |
| 2013/0328763 A1 | 12/2013 | Latta et al. | |
| 2014/0055396 A1 | 2/2014 | Aubauer et al. | |
| 2014/0071076 A1 | 3/2014 | Dogra et al. | |
| 2014/0184496 A1 | 7/2014 | Gribetz et al. | |
| 2016/0199730 A1 | 7/2016 | Olson et al. | |

OTHER PUBLICATIONS

Urban et al. "Recognition of Arm Gestures Using Multiple Orientation Sensors: Repeatability Assessment", 2004 IEEE Intelligent Transportation Systems Conference, Washington, D.C., USA, Oct. 3-6, 2004, 6 pages, <http/ieeexplore.ieee.org/xpl/login.jsp?tp=&arnumber=1398960&url=http%3A%2F%2Fieeexplore.ieee.org%2Fxpls%2Fabs_all.jsp%3Farnumber%3D1398960>.

* cited by examiner

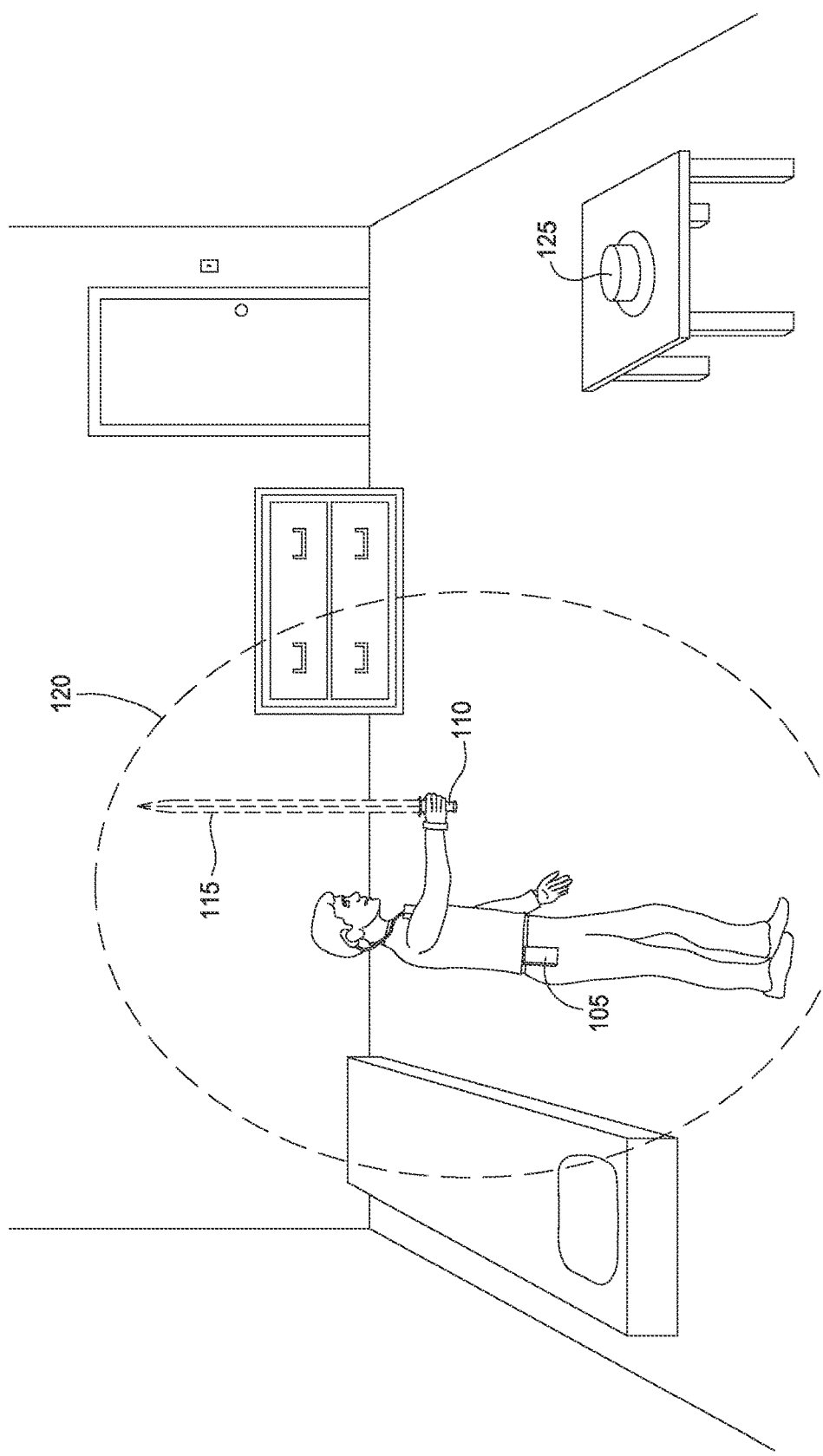

TRACKING SPECIFIC GESTURES RELATIVE TO USER MOVEMENT

BACKGROUND

Field

Embodiments of the present disclosure generally relate to inter-device communications, and more specifically to techniques for distinguishing specific gestures in user movements in an immersive play environment.

Description of the Related Art

Many approaches exist for delivering a play experience to a user. For instance, video games engage participants using interactive game play using a video game console, a handheld controller, and a display (e.g., a television, a monitor on the video game system, etc.). A participant interacts with the controller to send commands to the video game system to control a video game or other simulation. However, while video games allow participants to interact directly with the video game system, such interactions are often limited to the graphical depiction shown on the display and rarely influence any other objects outside of the world provided by the video game.

An immersive playtime environment addresses such limitations by simulating a play experience in a physical environment (e.g., a living room, a car, a city park) using a combination of devices, such as a controller device, wearable sensors, etc. For example, a controller device could detect that a user has performed a particular action (e.g., swinging a toy sword at an interactive object) and, in response, cause a plurality of interactive devices to perform audiovisual effects, creating a feeling of sensory immersion for the user, thus providing an enhanced sense of realism.

SUMMARY

One embodiment presented herein describes a platform providing an immersive play environment. The platform includes a controller device configured to transmit instructions to a plurality of interactive devices in the immersive play environment. The platform also includes a first tracking device configured to capture first tracking data. The platform also includes a second tracking device configured to capture second tracking data. The second tracking device is further configured to perform an operation for monitoring movement of a user during a play experience. The operation itself generally includes receiving the first tracking data from the tracking device. The operation also includes determining third tracking data based on a combination of the first tracking data and the second tracking data. The operation also includes transmitting the third tracking data to the controller device to determine whether the third tracking data corresponds to a predefined sequence of movements.

Another embodiment presented herein describes a method for monitoring movement of a user during a play experience. The method generally includes capturing first and second tracking data. The method also includes determining third tracking data based on a combination of the first tracking data and the second tracking data. The method also includes determining whether the third tracking data corresponds to a predefined sequence of movements.

Yet another embodiment presented herein describes a computer-readable storage medium storing instructions, which, when executed on a processor, perform an operation for monitoring movement of a user during a play experience. The operation generally includes capturing first and second tracking data. The operation also includes determining third tracking data based on a combination of the first tracking data and the second tracking data. The operation also includes determining whether the third tracking data corresponds to a predefined sequence of movements.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

FIG. 1 illustrates an immersive play environment, according to one embodiment.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 2A:
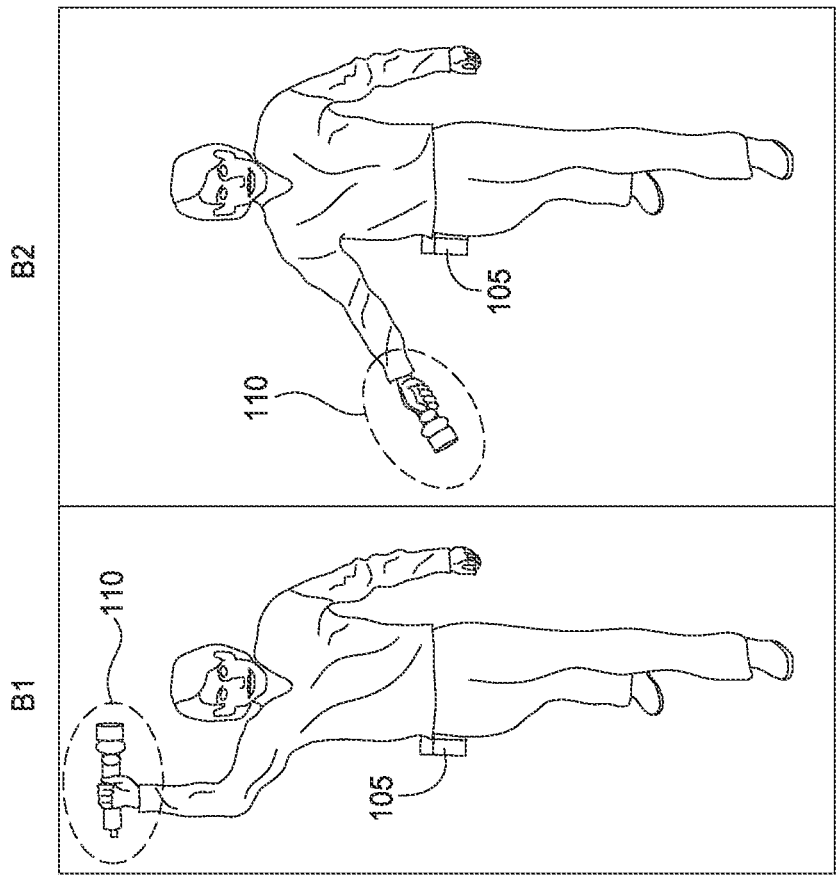
FIGS. 2A and 2B illustrate contrasting examples of a user swinging a hilt device along a forward vector and along a side vector relative to the body of the user, according to one embodiment.

An immersive play environment uses interactive devices configured within a given setting (e.g., a living room, a vehicle, a park) to provide sensory entertainment experience to the user, giving the user the illusion of being in another setting (e.g., a forest on a different planet, a flight hangar, a sports arena, etc.). For example, a controller device could detect that a user performs an action using a prop device, such as a toy sword that transmits signals to the controller device, whenever the user slashes the sword at an interactive object (e.g., a toy object or a location of an invisible object generated by the controller device). In response, the controller device can cause the interactive devices to perform audiovisual effects such as sound effects from the toy sword, reaction sounds from the interactive object, etc.

Further, the play experience may allow the user to perform a variety of sword fighting techniques against the interactive object, such as slashes and thrusts. That is, the user can hold the toy sword and make a sword fighting motion, such as a forward thrust. A tracker device can register user movement and transmit movement data to the controller device. The controller device detects a sword fighting move based on features of the movement data, such as the position, trajectory, and orientation of the user. The controller device can measure range and velocity thresholds relative to the interactive object to determine whether the user has successfully struck the interactive object.

One challenge in delivering an immersive play experience to a user is distinguishing movements using an interactive prop, such as a sword, from other movements of the user. For instance, a single tracking source (e.g., placed on a hilt of the sword) is often inadequate to distinguish instances where the user is performing a sword fighting technique and instances where the user is merely moving. For example, assume the user thrusts the sword forward. The tracking device may register the thrust as a particular movement. However, assume the user also holds the sword in a thrusting position but merely steps forward. In such a case, the tracking device might register such forward movement as being a thrusting forward of the sword, despite both being distinguishable from one another. To differentiate between such movements, the play environment might require the user to perform exaggerated movements to register a sword fighting technique. Such an approach may lower the overall experience for the user.

Embodiments presented herein describe techniques for tracking user movement in an immersive play environment. More specifically, techniques which allow trackers in the play environment to distinguish between specific gestures (e.g., sword fighting techniques) and other user movement. In particular, the play environment distinct tracking device in a hilt of a toy sword and a holster for the sword attached to a user. Note, the toy sword itself may just include a hilt or handle, allowing the blade to be represented as an imaginary element of the play experience. In such a case, the effect of the blade is managed by the controller device in presenting a given play experience, scenario, or encounter. The tracking device in the hilt registers and communicates movement by the user and to the holster, e.g., using radio frequency signals. Similarly, the tracking device in the holster registers movement of the user. In one embodiment, the tracking device in the holster may process the holster movement and the hilt movement to provide relatively precise user movement data (i.e., collective information on trajectory, position, orientation, etc., captured by the tracking devices as the user moves through physical space) to a controller device. In turn, the controller device can evaluate the movement data, e.g., to determine whether the user movement includes features (e.g., rotational velocity, direction of movement, acceleration, etc.) that correspond to the user performing a predefined sword fighting technique. For example, the controller device may evaluate, from the movement data, an arc of an imaginary line projecting from the hilt in 3D dimensional space (i.e., the sword "blade") with respect to a given target (e.g., an interactive toy object, an invisible target, etc.). If the respective arc vectors are within a given range of the target, and the rotational velocity of the movement exceeds a specified threshold, the controller device may register the movement as a "hit event," i.e., the user has successfully struck the target.

Because movement data generated from the tracking devices in the hilt and holster provide more precise user movement data, the controller device can better distinguish specific movement patterns, such as sword fighting techniques or some other choreographed motion, from ordinary user movements. Advantageously, the combination of tracking devices allows the play environment to recognize movements corresponding to some choreography without needing to define specific gestures (e.g., exaggerated movements with a sword) within the environment.

Note, the following references tracking devices provided in components of a toy sword as an example of differentiating choreographed movements of a user using the toy sword from ordinary movements of the user in an immersive play environment. However, one of ordinary skill in the art will recognize that embodiments described herein are applicable to a variety of scenarios requiring precise choreographed movements of a user during a play experience. For example, an immersive play environment related to baseball may provide a tracking device in a toy bat and another tracking device on a region of a user. The tracking devices may register user movement through a nine degree of freedom configuration (e.g., a combination of an accelerometer, gyroscope, and magnetometer) to provide precise user movement data. Gaming logic can evaluate the movement data relative to a target (e.g., an invisible ball object "thrown" in the direction of the user) to determine whether the bat "hit" the target.

FIG. 1 illustrates an immersive play environment, according to one embodiment. FIG. 1 depicts a user equipped with a wearable device, namely a holster device 105. In addition, FIG. 1 depicts the user holding a hilt device 110. The holster device 105 and the hilt device 110 collectively form a toy sword to use in the play environment. In one embodiment, the hilt device 110 and the holster device 105 are configured with trackers that measure user movement. The hilt device 110 communicates tracking information to the holster device 105. Further, the holster device 105 communicates tracking information measured by the hilt device 110 and the holster device 105 to a controller device 125.

In one embodiment, the controller device 125 instructs interactive devices to perform actions based on data received from the devices and game logic. Such interactive devices may include speakers and lights presenting audiovisual effects, action figures, the holster device 105, and the hilt device 110. Further, the controller device 125 may guide the user through a storyline scenario and through elements of the scenario, e.g., by providing cues to the user suggesting presence of imaginary elements such as enemies, vehicles, allies, etc.

In one embodiment, the toy sword does not include a physical blade. Illustratively, the hilt device 110 provides an imaginary blade (depicted by the dotted lines 115), projecting from the hilt device 110. A length and width of the imaginary blade is configurable with the hilt device 110. The hilt device 110 can measure movement of the imaginary blade across three-dimensional vector space, represented as a sphere 120 around the user. The sphere 120 represents the user's range with respect to the toy sword.

As stated, the holster device 105 sends tracking data observed by the holster device 105 and the hilt device 110 to the controller device 125. The controller device 125 may evaluate the tracking data relative to an interactive object, e.g., an invisible enemy associated with its own tracking data, to determine whether the user has "hit" an interactive object. For example, the controller device 125 can evaluate tracking properties of the arc created by the blade of the sword (i.e., the imaginary line projecting from the hilt device 110) when the user swings the sword. The controller device 125 can also measure the tracking properties with respect to a range of the imaginary enemy as well as the speed of the slash. If the arc is within range, and a rotational velocity of the swing exceeds a particular threshold, the controller device 125 can register a hit event. In response to a hit event, the controller device 125 can transmit instructions to the interactive devices within the play environment. For example, the controller device 125 can instruct an audio device to play a specified sound effect, e.g., of the invisible enemy being hit.

Using data from both the holster device 105 and the hilt device 110 allows the controller device 125 to better differentiate movements made with the sword from other movements. Further, doing so allows the controller device 125 to better evaluate precision of a desired sword fighting technique. As described below the trackers in the holster device 105 and the hilt device 110 form a nine degrees of freedom sensor configuration that includes a gyroscope, an accelerometer, and a magnetometer. The tracker in the hilt device 110 may communicate movement data to the holster device 110. Such a configuration allows the play environment to capture precise position and orientation data of the user. Doing so allows the holster device 110 to register the movement of the hilt with respect to the location of the holster. The controller device 125 may then determine whether the movement matches a given sword fighting technique.

In an alternative embodiment, the tracking devices may be configured in the hilt device 110 and a headset worn by the user. In such a case, the headset may include a three degrees of freedom configuration (e.g., a magnetometer) and the hilt device 110 may be configured with a six degrees of freedom configuration (e.g., an accelerometer and gyroscope), together forming a set of sensors having a nine degrees of freedom configuration. The hilt device 110 can transmit tracking data to the headset, which in terms measures tracking data of the hilt with respect to the headset.

In one embodiment, the play experience may include various categories of sword fighting techniques. For example, basic techniques may include one-handed and two-handed strikes going in an up, down, and side direction. The basic techniques may also include a lance strike (e.g., a stab) and a reverse lance (backward stab). The basic techniques may also include blocking and parrying using the hilt device 110. As another example, agile techniques require the user to perform some technique with a relatively high acceleration of the hilt device 110. Such techniques may include a spin attack by the user by using a regular or inverted grip of the hilt device 110, a slide attack, a roll attack, and a charging attack. Further, as another example, aerial techniques require the user to jump in the air and swing the hilt device 110. Aerial techniques may include a jumping strike, an uppercut strike, a jumping spin strike, and the like.

Each predefined technique may be associated with a particular choreography. The choreography is a specified sequence of moves to be performed in a particular order, at a particular position, at a particular velocity, etc. The hilt device 110 and holster device 105 may measure the user movements and forward the measured data to the controller device 115. In turn, the controller device 115 can compare the user movements to determine whether the user movements match a given predefined technique. If so, the controller device 115 can indicate to the user that the technique has been performed (e.g., by progressing through the play experience).

Figure 2B:
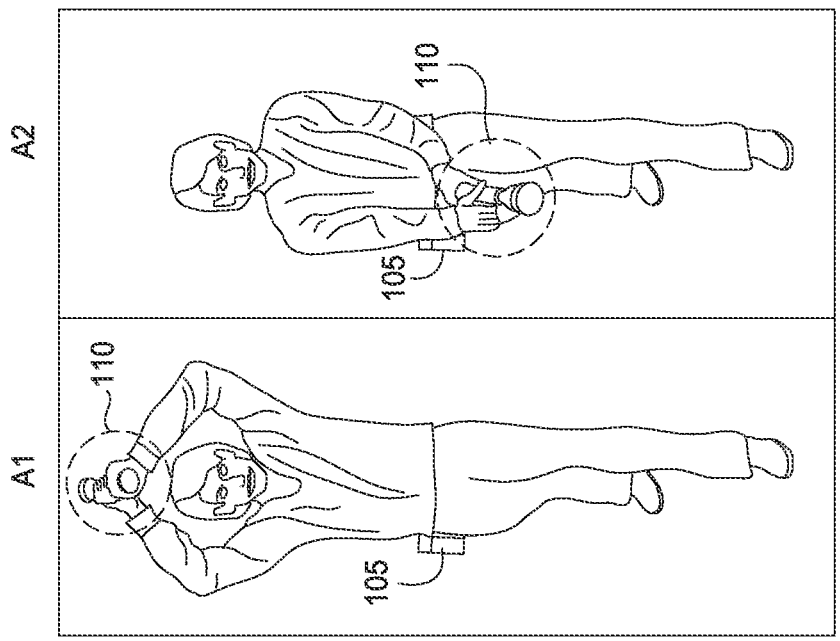

FIGS. 2A and 2B illustrate contrasting examples of a user swinging a hilt device 110 in a play environment, according to one embodiment. As shown in the movement depicted by A1 and A2 of FIG. 2A, the user swings the hilt device 110 along a forward vector relative to the body. As shown in the movement depicted by B1 and B2 in FIG. 2B, the user swings the hilt device 110 along a side vector relative to the body.

Typically, in a setting where only one tracker device is used, e.g., in the hilt, the controller device 125 would be unable to distinguish the movement in A1 and A2 from the movement in B1 and B2, because in this case, the tracker captures the same motion and direction for both movements, i.e., the hilt moving from up to down. However, by providing a second tracker in the holster device 105, the tracker in the holster device 105 can determine the position of the hilt relative to the position of the holster.

Figure 3A:
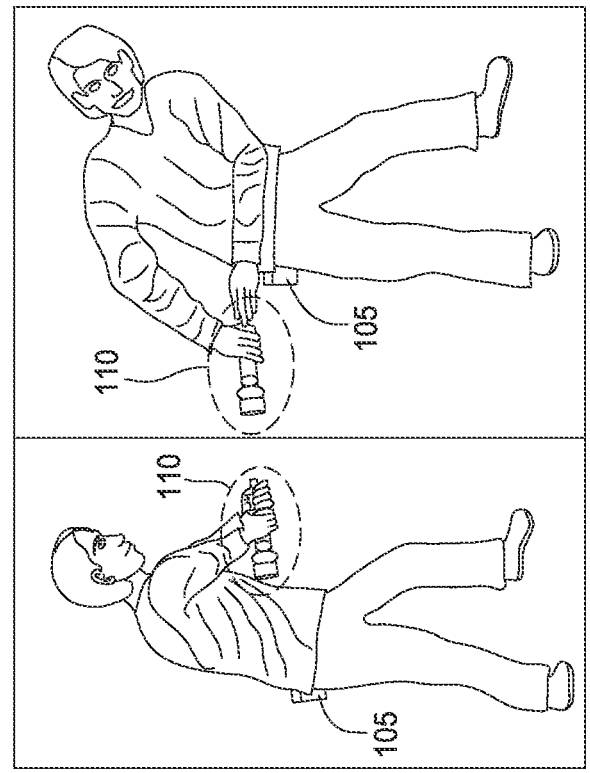
FIGS. 3A and 3B illustrate contrasting examples of a user thrusting a hilt device forward and backward relative to the body of the user, according to one embodiment.
Figure 3B:
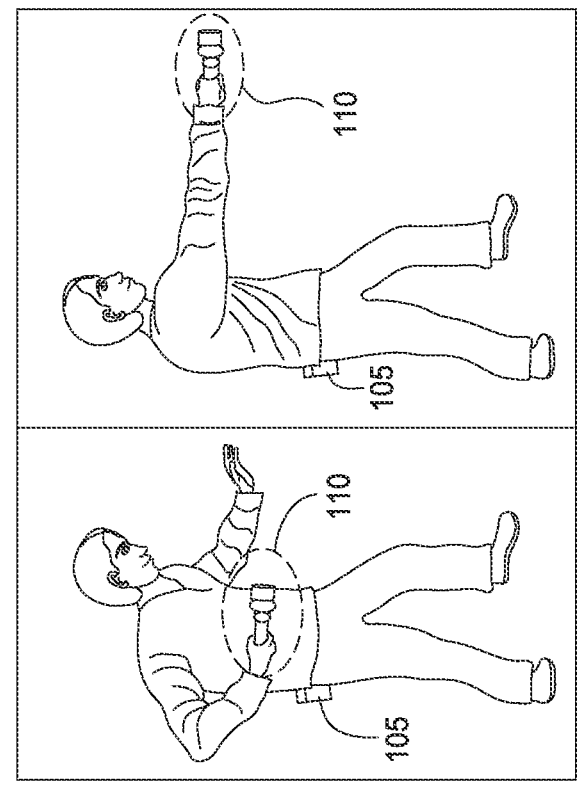

As another example, FIGS. 3A and 3B illustrate contrasting examples of a user thrusting the hilt device 110, according to one embodiment. The movement depicted from A1 to A2 in FIG. 3A represents the user thrusting the hilt device 110 forward relative to the body of the user. The movement depicted from B1 to B2 in FIG. 3B represents the user thrusting the sword backward relative to the body of the user. Again, one tracking device may be insufficient to capture and distinguish both movements. However, by having an additional tracking device provided in the holster device 105, the holster device 105 may register both movements as two distinct movements.

Figure 4:
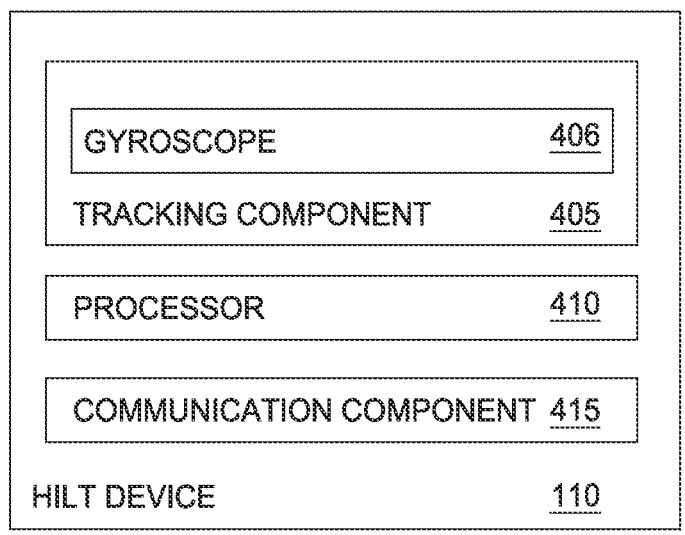
FIG. 4 illustrates a hilt device configured to track user movement, according to one embodiment.

FIG. 4 illustrates a hilt device 110 configured to track user movement, according to one embodiment. As shown, the hilt device 110 includes a tracking component 405, a processor 410, and a communication component 415.

In one embodiment, the tracking component 405 further includes a gyroscope 406. The gyroscope 406 is a sensor that tracks orientation of the hilt in physical space. Further, the gyroscope 406 measures rotation along an axis as well as the rate of rotation around the axis. The processor 410 converts measurements obtained by the tracking component into a quaternion. The quaternion includes the rotational and orientation data captured by the tracking component 405.

The communication component 415 transmits, e.g., via radio frequency signals, the quaternion to the holster device 105. As described further below, the holster device 105 evaluates the tracking data sent by the communication component 415. The holster device 105 can then determine the movement of the hilt based on the location and movement of the holster. The controller device 115 can evaluate such tracking data to determine whether features in the data (e.g., rotational velocity, acceleration, trajectory, etc.) match a given predefined sword fighting technique.

Figure 5:
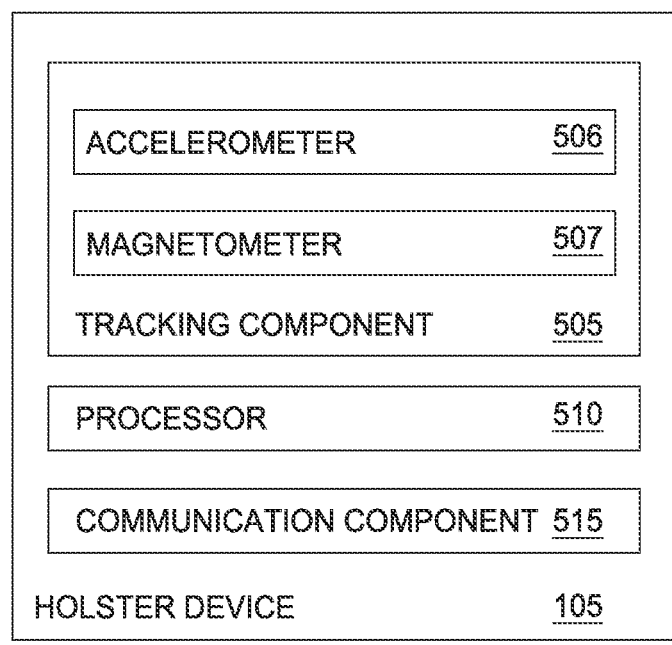
FIG. 5 illustrates a holster device configured to track user movement, according to one embodiment.

FIG. 5 illustrates a holster device configured to track user movement, according to one embodiment. As shown, the holster device 105 includes a tracking component 505, a processor 510, and a communication component 515.

In one embodiment, the tracking component 505 further includes an accelerometer 506 and a magnetometer 507. The accelerometer 506 measures acceleration of the holster 105 along an x-, y-, and z-axis. The magnetometer 507 measures magnitude and a direction of a magnetic field in three dimensions. As such, the accelerometer 506 and magnetometer 507 provide movement data (e.g., acceleration, direction, position) as the user moves through the physical space.

The communication component 515 can transmit and receive radio frequency signals from interactive devices within the immersive play environment. In particular, the communication component 515 can receive tracking data (i.e., the quaternion generated by the processor 410) sent by the hilt device 110. The processor 510 evaluates tracking data received from the hilt device 110 with the tracking data observed by the tracking component 505. Doing so allows the processor 510 to determine movement of the hilt device 110 relative to the holster device 105. The processor 510 may generate a new set of tracking data based on the evaluation. The new set of tracking data allows the controller device 125 to differentiate from one particular movement (e.g., a downward slash along a forward vector relative to the body) from another movement (e.g., a downward slash along a side vector relative to the body).

In one embodiment, the communication component 515 receives and transmits radio-frequency signals from other interactive devices in the immersive play environment. The communication component 515 may transmit the new set of tracking data to the controller device 125. The controller device 125 may evaluate the tracking data to identify particular movements (e.g., sword fighting techniques) made during gameplay. For example, the controller device 125, as part of the gameplay, may require the user to perform a "kata," i.e., a particular choreographed movement, with the sword to advance a given scenario. The kata can be a sequence of particular movements. The controller device 125 can evaluate the tracking data to determine whether movements made by the user match the kata. In response, the controller device 125 can transmit audio to be reproduced as a result the user successfully completing a kata, e.g., "Good! You have canceled out his Capo Ferro."

Figure 6:
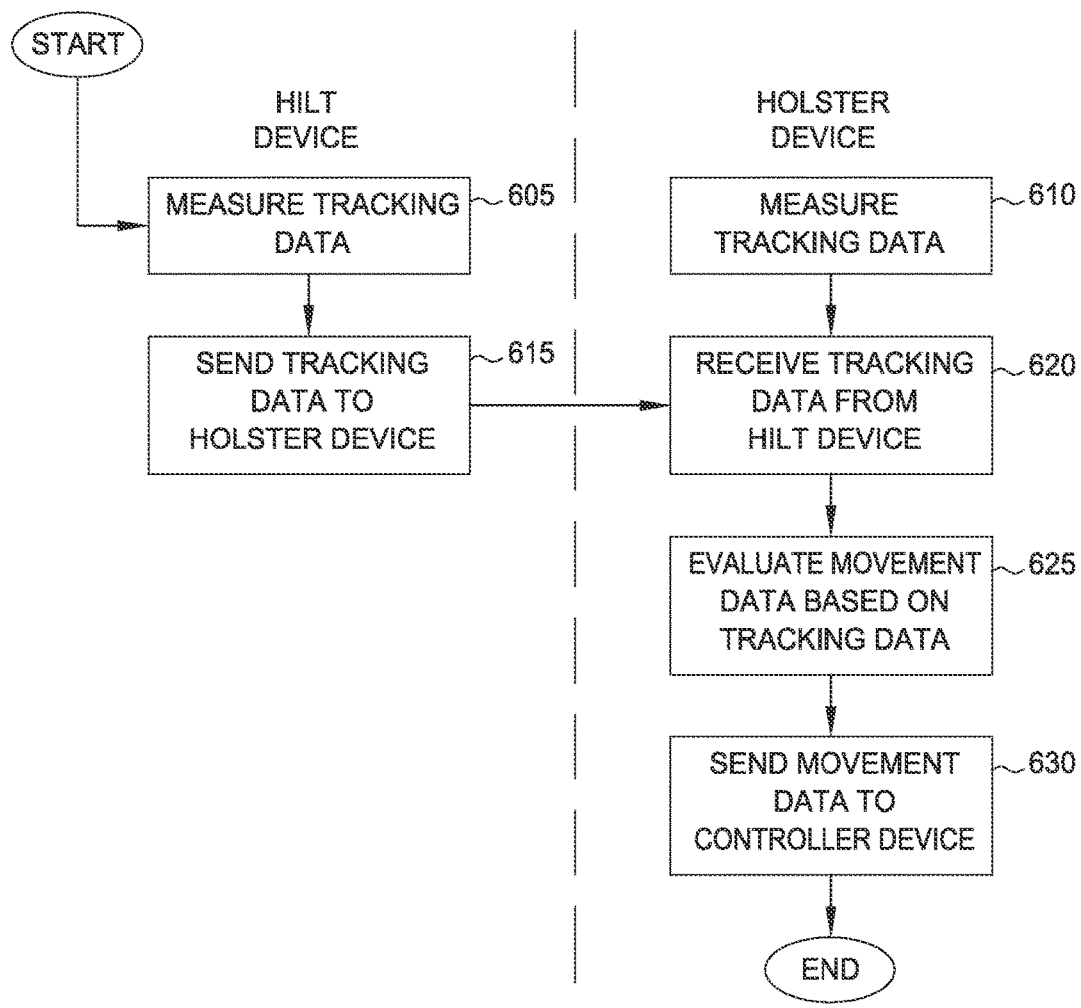
FIG. 6 illustrates a method for tracking user movement to distinguish various types of movement, according to one embodiment.

FIG. 6 illustrates a method 600 for tracking user movement to distinguish various types of movement, according to one embodiment. Method 600 begins at step 605, where the tracking component 405 measures tracking data, i.e., as the user moves the hilt device 110 across physical space. As stated, the tracking component 405 may capture orientation data of the hilt device 110. Once captured, the processor 410 may convert the orientation data into a quaternion.

Concurrently, at step 610, the holster device 105 measures tracking data, i.e., as the user through space while wearing the holster device 105. The tracking component 505 may track user movements through the physical space (i.e., such as the user walking, spinning, dancing, etc.).

At step 615, the communication component 415 sends the tracking data (packaged as a quaternion) to the holster device 105. At step 620, the holster device 105 receives the tracking data from the hilt device 110. At step 625, the tracking component evaluates the tracking data generated by both the holster device 105 and the hilt device 110. The tracking component generates new tracking data based on the evaluation. Such tracking data provides context for the movement of the hilt across physical space, allowing other devices, e.g., the controller device 125, to distinguish between particular movements from others.

At step 630, the communication component 515 transmits the new set of tracking data to the controller device 125. In turn, the controller device 125 can evaluate the tracking data against predefined techniques to determine whether the tracking data includes features (rotational velocity, acceleration, trajectory, etc.) matching one or the predefined techniques. For example, the controller device 125 can evaluate the rotational velocity of a given movement. In addition, the controller device 125 can also evaluate the direction of the movement (e.g., whether the hilt device 110 is moving an upward, downward, or side-to-side direction).

Based on such movements, the controller device 125 can identify that the user has performed a predefined technique. In response, the controller device 125 can cause audio to be played by speaker and subwoofer devices in the immersive play environment. Further, the controller device 125 can evaluate the line projecting from the hilt device (i.e., an imaginary sword blade) to determine whether the line is within range of an interactive object (e.g., an action figure device, an invisibly enemy generated to engage the user, etc.). If so (and the rotational velocity has exceeded a specified threshold), the controller device 125 can register a hit event, i.e., the user has successfully struck the interactive object.

As another example, as part of a given scenario, the controller device 125 can require the user to perform a specific sequence of choreographed movements to advance a storyline, e.g., in countering against an enemy attack. The controller device 125 can evaluate the tracking data obtained from the holster device 105 and determine whether observed user movements match a given set of movements. In such a case, the controller device 125 may instruct devices to perform certain commands, such as reproducing audio acknowledging whether the user successfully completed the choreographed sequence.

Figure 7:
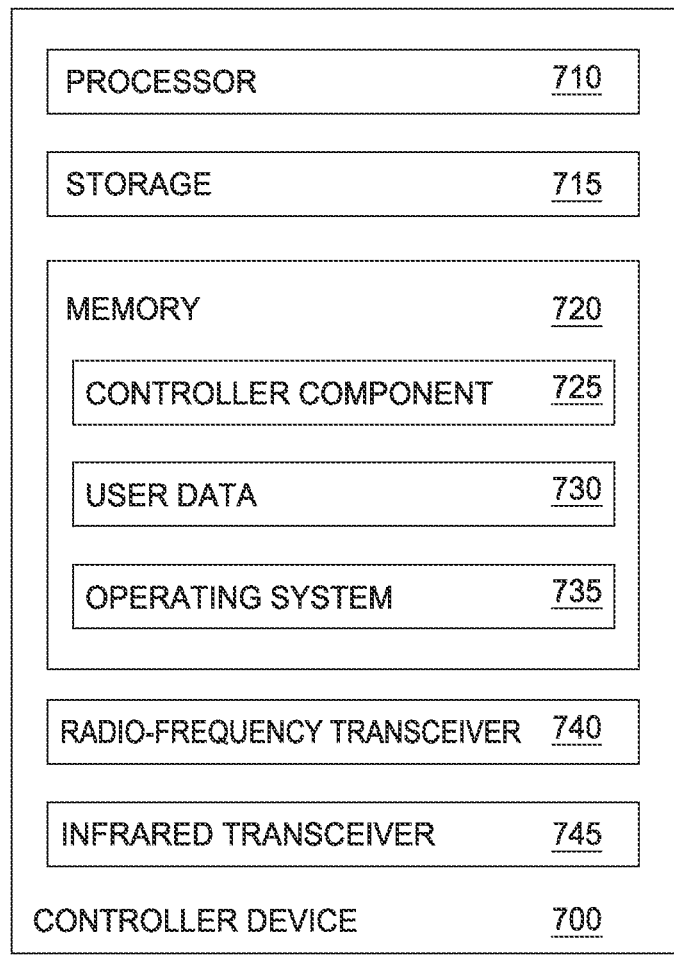
FIG. 7 illustrates a controller device configured to distinguish specific gestures in user movement, according to one embodiment.

FIG. 7 illustrates a controller device 700 configured to register movements tracked in an immersive play environment, according to one embodiment. As shown, the controller device 700 includes a processor 710, storage 715, memory 720, a radio-frequency transceiver 740 and an infrared transceiver 745. Generally, the processor 710 retrieves and executes programming instructions stored in the memory 720. Processor 710 is included to be representative of a single CPU, multiple CPUs, a single CPU having multiple processing cores, GPUs having multiple execution paths, and the like. The memory 720 is generally included to be representative of a random access memory. The radio-frequency transceiver 740 enables the controller device 700 to transmit and receive radio-frequency signals. Likewise, the infrared transceiver 745 allows the device 700 to transmit and receive infrared signals. Further, while the depicted embodiment illustrates the components of a particular controller device 700, one of ordinary skill in the art will recognize that interactive objects may use a variety of different hardware architectures. Moreover, it is explicitly contemplated that embodiments may be implemented using any device or computer system capable of performing the functions described herein.

The memory 720 represents any memory sufficiently large to hold the necessary programs and data structures. Memory 720 could be one or a combination of memory devices, including Random Access Memory, nonvolatile or backup memory (e.g., programmable or Flash memories, read-only memories, etc.). In addition, memory 720 and storage 715 may be considered to include memory physically located elsewhere; for example, on another computer communicatively coupled to the controller device 700.

Illustratively, the memory 520 includes a controller component 725, user data 730 and an operating system 735. The operating system 735 generally controls the execution of application programs on the controller device 700.

Generally, the controller component 725 configures the interactive objects to perform particular actions. The particular actions can also be based on the user data 730 (e.g., historical interactions data between the user and various interactive objects, user preferences data, etc.) and one or more environmental factor (e.g., a room of the house the object is currently in, a time of day, a day of the week, etc.).

For instance, the controller component 725 may configure tracking sensors to transmit tracking information (e.g., position and orientation information) describing locations of tracking devices equipped by the user. Doing so allows the controller component 725 to evaluate movement data of the tracking devices moving through a physical space.

Further, in one embodiment, the controller component 725 is configured with logic for recognizing particular events and broadcasting commands for the devices to perform a corresponding action(s) in response. In such an embodiment, the controller component 725 could use input/output devices (e.g., cameras, microphones, wireless transceivers, infrared sensors, etc.) to detect when a particular event occurs. For instance, the controller component 725 could use a camera to detect when a particular projection appears, and could then broadcast a command (e.g., using a RF signal) instructing the devices to perform a corresponding action in response. As another example, the controller component 725 can register movements tracked by tracking sensors and detect particular gameplay movements being made by the user, such as sword fighting techniques. The controller component 725 can evaluate the tracking data and perform actions in response to such movements, e.g., sending commands to audio devices to play sounds, sending commands to other devices to activate light-emitting devices, etc.

Generally speaking, the devices and the controller 700 may be implemented in any number of different ways, consistent with the present disclosure. With respect to hardware, embodiments may employ a modular design for maximum hardware reusability across different interactive objects. Such a design could include, for instance, hardware adapters that allow common processors, memories and buses to receive and send data via a multiplicity of sensors, displays, effectors and other means of communication. Additionally, system and/or operating system agnostic sites (e.g., Portals) could be used to ensure maximum compatibility for all users.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flowchart illustration, can be implemented by special-purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A platform providing an immersive play environment, the platform comprising:
    a controller device configured to transmit instructions to an interactive toy device in the immersive play environment;
    a plurality of tracking devices of a user during a play experience in a physical space, the plurality of tracking devices including a handheld device configured to be held by the user and a wearable device configured to be worn by the user, wherein the handheld device and the wearable device include at least one of a gyroscope, an accelerometer, and a magnetometer, wherein each of the handheld device and the wearable device is configured to capture movement of the user in the physical space over time as first tracking data and second tracking data, respectively, wherein a virtual object is extrapolated from the handheld device in a three-dimensional vector space corresponding to the physical space, wherein the virtual object is substantially linear, wherein the wearable device is configured to receive the first tracking data from the handheld device, generate combined tracking data based at least in part on the first tracking data and the second tracking data, and transmit the combined tracking data to the controller device, whereupon the controller device:
        determines that the combined tracking data reflects a movement sequence that triggers a hit event, based on determining: (i) that the movement sequence is within a predefined range of the interactive toy device and (ii) that the movement sequence defines an arc in the three-dimensional vector space with a rotational velocity exceeding a specified threshold velocity; and
        upon determining that the movement sequence triggers the hit event, causes the interactive toy device to perform, in the physical space, an action simulating collision between the virtual object and the interactive toy device absent a physical collision therebetween, the action comprising an effect selected from an audio effect, a visual effect, and an audiovisual effect.

2. The platform of claim 1, wherein the handheld device includes the gyroscope, wherein the wearable device includes the accelerometer and the magnetometer.

3. The platform of claim 1, wherein the handheld device simulates a sword object.

4. The platform of claim 3, wherein the hit event comprises a sword hit event, wherein the controller device is further configured to:

register the sword hit event during the play experience; and
notify the user of the sword hit event.

5. The platform of claim 3, wherein the controller device is further configured to:
    upon determining that either the rotational velocity does not exceed the specified threshold velocity or that the movement sequence is not within the predefined range of the interactive toy device, register a miss event during the play experience; and
    notify the user of the miss event.

6. The platform of claim 1, wherein the controller device is further configured to instruct the user of a next movement sequence.

7. A computer-implemented method for monitoring movement of a user during a play experience in a physical space, the computer-implemented method comprising:
    receiving combined tracking data associated with a plurality of tracking devices of the user, the plurality of tracking devices including a handheld device configured to be held by the user and a wearable device configured to be worn by the user, wherein the handheld device and the wearable device include at least one of a gyroscope, an accelerometer, and a magnetometer, wherein each of the handheld device and the wearable device is configured to capture the movement of the user in the physical space over time as first tracking data and second tracking data, respectively, wherein a virtual object is extrapolated from the handheld device in a three-dimensional vector space corresponding to the physical space, wherein the virtual object is substantially linear, wherein the wearable device is configured to receive the first tracking data from the handheld device and generate combined tracking data based at least in part on the first tracking data and the second tracking data, wherein the combined tracking data is received from the wearable device;
    determining, by a controller device, that the combined tracking data reflects a movement sequence that triggers a hit event, based on determining: (i) that the movement sequence is within a predefined range of an interactive toy device and (ii) that the movement sequence defines an arc in the three-dimensional vector space with a rotational velocity exceeding a specified threshold velocity; and
    upon determining that the movement sequence triggers the hit event, causing the interactive toy device to perform, in the physical space, an action simulating collision between the virtual object and the interactive toy device absent a physical collision therebetween, the action comprising an effect selected from an audio effect, a visual effect, and an audiovisual effect.

8. The computer-implemented method of claim 7, wherein the handheld device simulates a sword object.

9. The computer-implemented method of claim 8, wherein the hit event comprises a sword hit event, wherein the computer-implemented method further comprises:
    registering the sword hit event during the play experience; and
    notifying the user of the sword hit event.

10. The computer-implemented method of claim 8, further comprising:
    upon determining that either the rotational velocity does not exceed the specified threshold velocity or that the movement sequence is not within the predefined range of the interactive toy device, registering a miss event during the play experience; and
    notifying the user of the miss event.

11. The computer-implemented method of claim 7, further comprising; instructing the user of a next movement sequence.

12. The computer-implemented method of claim 7, wherein that the movement sequence triggers the hit event is determined with a higher measure of precision than in an absence of one of the handheld tracking device and the wearable tracking device.

13. The computer-implemented method of claim 12, wherein the controller device is configured to transmit instructions to the interactive toy device in the physical space, wherein the handheld device simulates a sword object, wherein the hit event comprises a sword hit event, wherein the computer-implemented method further comprises:
upon determining that the movement sequence triggers the hit event, registering the sword hit event during the play experience; and
notifying the user of the sword hit event.

14. The computer-implemented method of claim 13, further comprising:
upon determining that the rotational velocity does not exceed the specified threshold velocity, registering a first miss event during the play experience, whereafter the user is notified of the first miss event; and
upon determining that the movement sequence is not within the predefined range of the interactive toy device, registering a second miss event during the play experience, whereafter the user is notified of the second miss event.

15. The computer-implemented method of claim 14, further comprising instructing the user of a next movement sequence different than the movement sequence.

16. A non-transitory computer-readable medium storing instructions executable to perform an operation for monitoring movement of a user during a play experience in a physical space, the operation comprising:
receiving combined tracking data associated with a plurality of tracking devices of the user, the plurality of tracking devices including a handheld device configured to be held by the user and a wearable device configured to be worn by the user, wherein the handheld device and the wearable device include at least one of a gyroscope, an accelerometer, and a magnetometer, wherein each of the handheld device and the wearable device is configured to capture the movement of the user in the physical space over time as first tracking data and second tracking data, respectively, wherein a virtual object is extrapolated from the handheld device in a three-dimensional vector space corresponding to the physical space, wherein the virtual object is substantially linear, wherein the wearable device is configured to receive the first tracking data from the handheld device and generate combined tracking data based at least in part on the first tracking data and the second tracking data, wherein the combined tracking data is received from the wearable device;
determining that the combined tracking data reflects a movement sequence that triggers a hit event, based on determining: (i) that the movement sequence is within a predefined range of an interactive toy device and (ii) that the movement sequence defines an arc in the three-dimensional vector space with a rotational velocity exceeding a specified threshold velocity; and
upon determining that the movement sequence triggers the hit event, causing the interactive toy device to perform, in the physical space, an action simulating collision between the virtual object and the interactive toy device absent a physical collision therebetween, the action comprising an effect selected from an audio effect, a visual effect, and an audiovisual effect.

17. The non-transitory computer-readable medium of claim 16, wherein the handheld device simulates a sword object.

18. The non-transitory computer-readable medium of claim 17, wherein the hit event comprises a sword hit event, wherein the operation further comprises:
registering the sword hit event during the play experience; and
notifying the user of the sword hit event.

19. The non-transitory computer-readable medium of claim 16, wherein the handheld device simulates a sword object, wherein the operation further comprises:
upon determining that either the rotational velocity does not exceed the specified threshold velocity or that the movement sequence is not within the predefined range of the interactive toy device, registering a miss event during the play experience; and
notifying the user of the miss event.

20. The non-transitory computer-readable medium of claim 16, wherein the operation further comprises instructing the user of a next movement sequence.

* * * * *